(12) United States Patent
Neitzke et al.

(10) Patent No.: US 8,109,728 B2
(45) Date of Patent: Feb. 7, 2012

(54) ADJUSTING APPARATUS FOR ADJUSTING THE PITCH ANGLE OF PROPELLER BLADES, VARIABLE-PITCH PROPELLER, CONTROL FUNCTION WHICH CAN BE IMPLEMENTED IN A COMPUTER, AND METHOD FOR ADJUSTING THE PITCH ANGLE OF PROPELLER BLADES

(75) Inventors: Klaus-Peter Neitzke, Bremen (DE); Andreas Ulrich, Bremen (DE)

(73) Assignee: Airbus Deutschland GmbH, Hamburg (DE)

( * ) Notice: Subject to any disclaimer, the term of this patent is extended or adjusted under 35 U.S.C. 154(b) by 549 days.

(21) Appl. No.: 12/306,429

(22) PCT Filed: Jun. 25, 2007

(86) PCT No.: PCT/IB2007/052451
§ 371 (c)(1),
(2), (4) Date: Feb. 4, 2009

(87) PCT Pub. No.: WO2008/001299
PCT Pub. Date: Jan. 3, 2008

(65) Prior Publication Data
US 2009/0297348 A1    Dec. 3, 2009

(30) Foreign Application Priority Data

Jun. 24, 2006  (DE) .......................... 10 2006 029 057

(51) Int. Cl.
*B64C 27/00* (2006.01)
*B64C 11/06* (2006.01)
*B64C 11/30* (2006.01)
*B63H 1/06* (2006.01)
*F01D 7/00* (2006.01)
*F03B 3/14* (2006.01)
*F04D 29/36* (2006.01)

(52) U.S. Cl. ...................................................... 416/147
(58) Field of Classification Search .................. 416/147
See application file for complete search history.

(56) References Cited

U.S. PATENT DOCUMENTS

| 4,958,289 A | 9/1990 | Sum et al. |
| 2007/0110577 A1 | 5/2007 | Danielson |

FOREIGN PATENT DOCUMENTS

| EP | 1 787 906 A | 5/2007 |
| GB | 740466 A | 11/1955 |
| GB | 846703 A | 8/1960 |

*Primary Examiner* — David Zarneke
(74) *Attorney, Agent, or Firm* — Greenblum & Bernstein, P.L.C.

(57) ABSTRACT

Apparatus for adjusting pitch angle of propeller blades of a variable-pitch propeller. The blades being adjustable in a first blade pitch-angle range with positive pitch angles, in a second blade pitch-angle range, and in a third blade pitch-angle range with negative pitch angles. The second blade pitch-angle range is an intermediate range located between the first and the third blade pitch-angle range, which includes the pitch-angle range where blade drag is a minimum, and ranges of positive pitch angles with low thrust and of negative pitch angles with low reverse thrust. The apparatus provides adjustment of the propeller blades from the first to the third blade pitch-angle range and vice versa, and is designed to be operated so that at least a first group of propeller blades can be rotated through the second blade pitch-angle range, while propeller blades in another group are in a positive blade pitch-angle range.

31 Claims, 6 Drawing Sheets

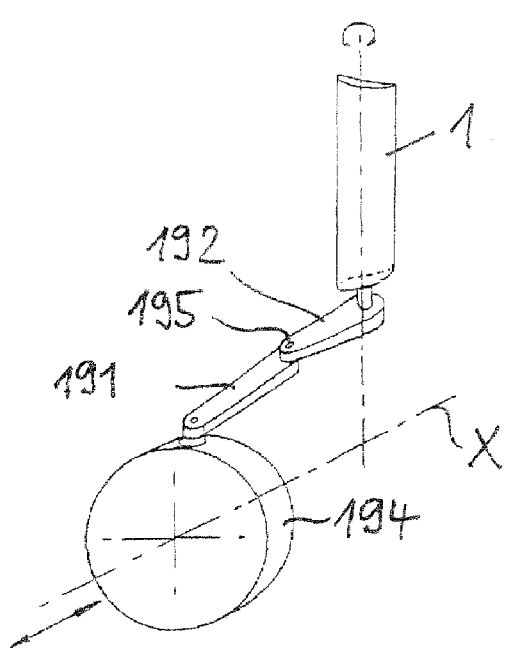
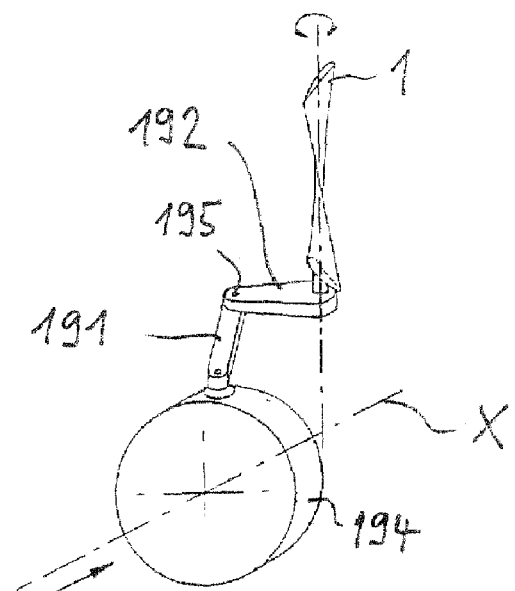
Fig. 5a  Fig. 5b
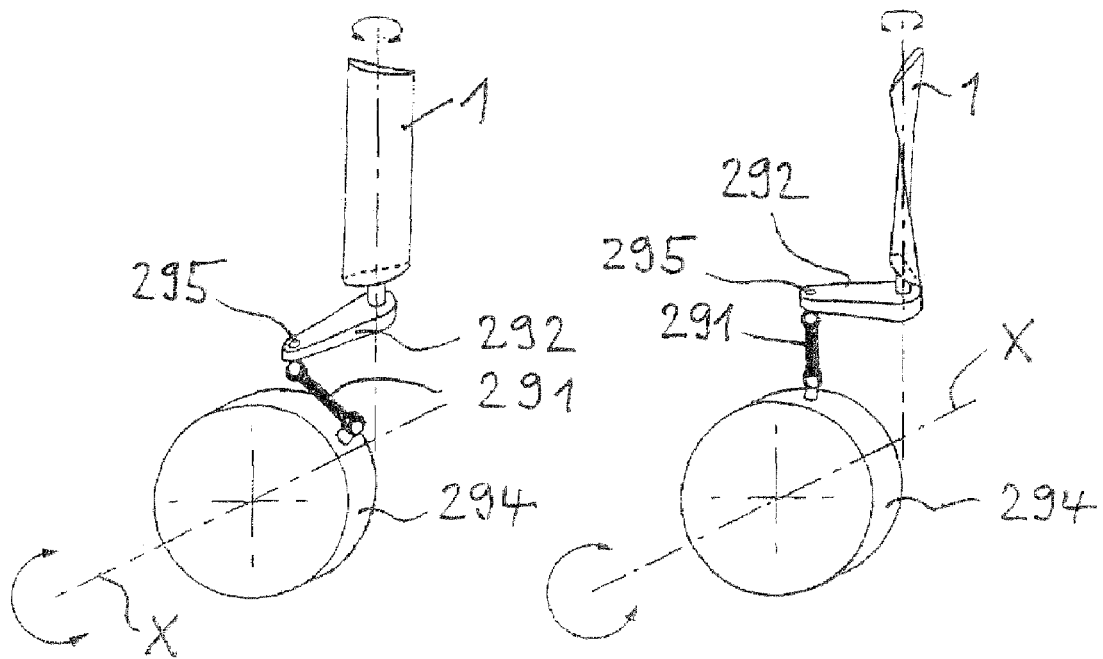
Fig. 6a  Fig. 6b

ADJUSTING APPARATUS FOR ADJUSTING THE PITCH ANGLE OF PROPELLER BLADES, VARIABLE-PITCH PROPELLER, CONTROL FUNCTION WHICH CAN BE IMPLEMENTED IN A COMPUTER, AND METHOD FOR ADJUSTING THE PITCH ANGLE OF PROPELLER BLADES

The invention relates to an adjusting apparatus for adjusting the pitch angle of propeller blades of a variable-pitch propeller, to a variable-pitch propeller, to a control apparatus for actuating an adjusting apparatus, to a control function which can be implemented in a computer for adjusting the adjusting apparatus, and to a method for adjusting the pitch angle of propeller blades.

High-performance propeller-driven aircraft have variable-pitch propellers in which the pitch angle of the propeller blades can be matched to the respective flight conditions (takeoff, climbing flight, cruise flight, descending flight, landing), and, in the final phase of the landing process, can be set to produce reverse thrust for braking purposes. For the flight mode, the propeller blades are set to a defined positive pitch angle, while the pitch angle of the propeller blades in the reverse-thrust mode is negative, with the propeller rotating in the same direction.

During the transition from the thrust mode to the braking or reverse-thrust mode, the propeller blades must be rotated from the positive to the negative pitch-angle range. During the process, the propeller is driven by the wind of motion. In a critical zone during the transition from the positive to the negative pitch-angle range, that is to say when the propeller is producing neither thrust nor reverse thrust, the propeller rotation speed rises to a high value because the aerodynamic drag on the propeller blades is then low. This leads to a high load on the entire drive system, in particular on a turbine contained in it. According to the prior art, the aim is to overcome this problem by major twisting of the propeller blades, derated design of the loaded drive components, and/or passing through the critical zone, in which neither thrust nor reverse thrust is being produced, particularly quickly. However, all of these measures have associated disadvantages.

The object of the invention is to provide an improved adjusting apparatus for adjusting the pitch angle of propeller blades of a variable-pitch propeller, a variable-pitch propeller, a control apparatus for actuating an adjusting apparatus, a control function which can be implemented in a computer for adjusting the adjusting apparatus, and a method for adjusting the pitch angle of propeller blades, by means of which the drive system is lightly loaded on thrust reversal.

This object is achieved by the subject matters of the independent claims. Further embodiments are specified in the dependent claims which refer back to them.

The invention provides a variable-pitch propeller having a number of propeller blades which can be adjusted between pitch angles at which the propeller produces thrust and pitch angles at which the propeller produces reverse thrust while rotating in the same direction, and with an adjusting apparatus for adjusting the propeller blade pitch angle, with the propeller blades being rotated during adjustment through a critical zone in which they produce neither thrust nor reverse thrust. The invention provides for the propeller blades to be grouped into at least one first group of propeller blades and one second group of propeller blades, and for the adjusting apparatus to be designed such that the propeller blades in one group are rotated through the critical zone while the propeller blades in the other group are not located in the critical zone.

One example of the variable-pitch propeller according to the invention provides for the adjusting apparatus to be designed such that only the propeller blades in one group are rotated through the critical zone in order to produce reverse thrust, with the reverse thrust produced by the propeller blades that have been rotated through the critical zone being greater than the thrust produced by the propeller blades which have not been rotated through the critical zone.

Another example of the variable-pitch propeller according to the invention provides for the adjusting apparatus to be designed such that the groups of propeller blades are rotated through the critical zone at different times, so that the propeller blades in one group produce thrust or reverse thrust when the propeller blades in the other group are producing neither thrust nor reverse thrust, and vice versa.

According to one embodiment of the variable-pitch propeller according to the invention, the propeller blades are mounted on a blade root such that they can rotate about a blade axis which extends radially with respect to the propeller axis, and the adjusting apparatus comprises at least one yoke, which can be moved in the longitudinal direction of the propeller axis, and intermediate elements which are coupled in a hinged form between the yoke and force action points which are provided eccentrically with respect to the blade axis at the blade root of the respective propeller blade, which intermediate elements cause the propeller blade to rotate about its axis when the yoke is moved in the longitudinal direction of the propeller axis, with the force action points of one group of propeller blades and of the other group of propeller blades being offset with respect to one another such that the propeller blades in one group are rotated through the critical zone while the propeller blades in the other group are not located in the critical zone.

According to one embodiment of the variable-pitch propeller according to the invention, the propeller has an even number of propeller blades, which are grouped into two groups of propeller blades which are each offset individually with respect to one another.

One exemplary embodiment of the invention will be described in the following text with reference to the attached figures, in which:

FIG. 5a shows a perspective illustration of a further example of the adjusting apparatus in a first position;

FIG. 5b shows a perspective illustration of the further example of the adjusting apparatus in FIG. 5a, in a second position;

FIG. 6a shows a perspective illustration of a further example of the adjusting apparatus in a first position;

FIG. 6b shows a perspective illustration of the further example of the adjusting apparatus in FIG. 6a, in a second position;

Figure 1:
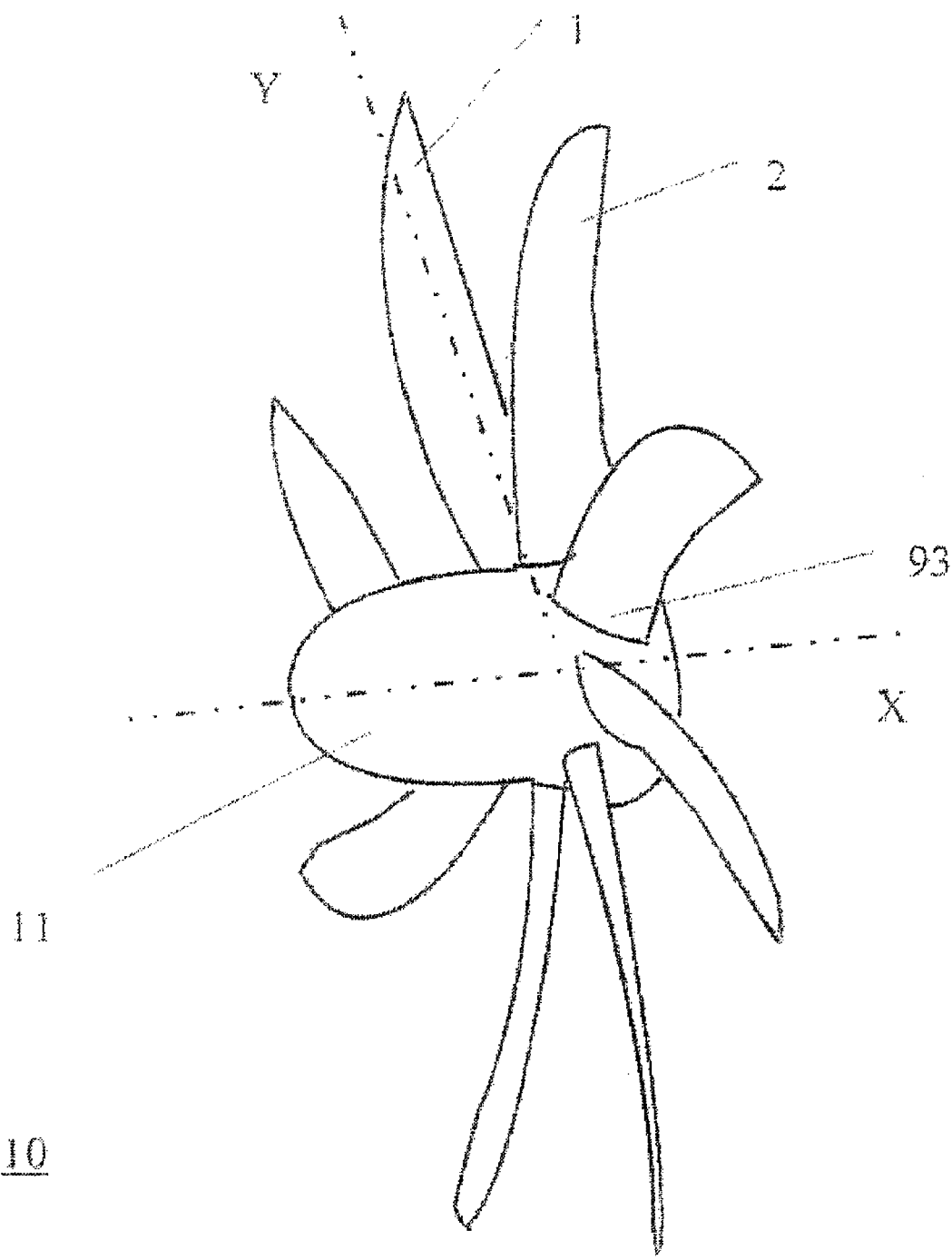
FIG. 1 shows a simplified perspective view of a variable-pitch propeller according to one exemplary embodiment of the invention.

FIG. 1 shows a perspective illustration of a propeller 10 for a modern high-performance propeller-driven aircraft, which has a number of propeller blades 1, 2, . . . . The propeller 10 may, in particular, be driven by a turbine. The pitch angle of the propeller blades 1, 2, . . . can be adjusted individually, such that the position of the propeller blades can be matched to the flight state of the aircraft, that is to say takeoff, landing, cruise flight, descending flight or climbing flight. Furthermore, the pitch angle of the propeller blades 1, 2, . . . can also be adjusted such that the propeller produces reverse thrust while rotating in the same direction, so that the aircraft can be braked in the final phase of the landing process by means of reverse thrust. The pitch angle of the propeller blades 1, 2, . . . is defined to be positive for the thrust mode, and negative for the reverse-thrust mode. The propeller blades 1, 2, . . . can each be rotated about an axis Y, which runs essentially in the longitudinal direction of each propeller blade 1, 2, . . . and radially with respect to the propeller axis X.

Figure 2:
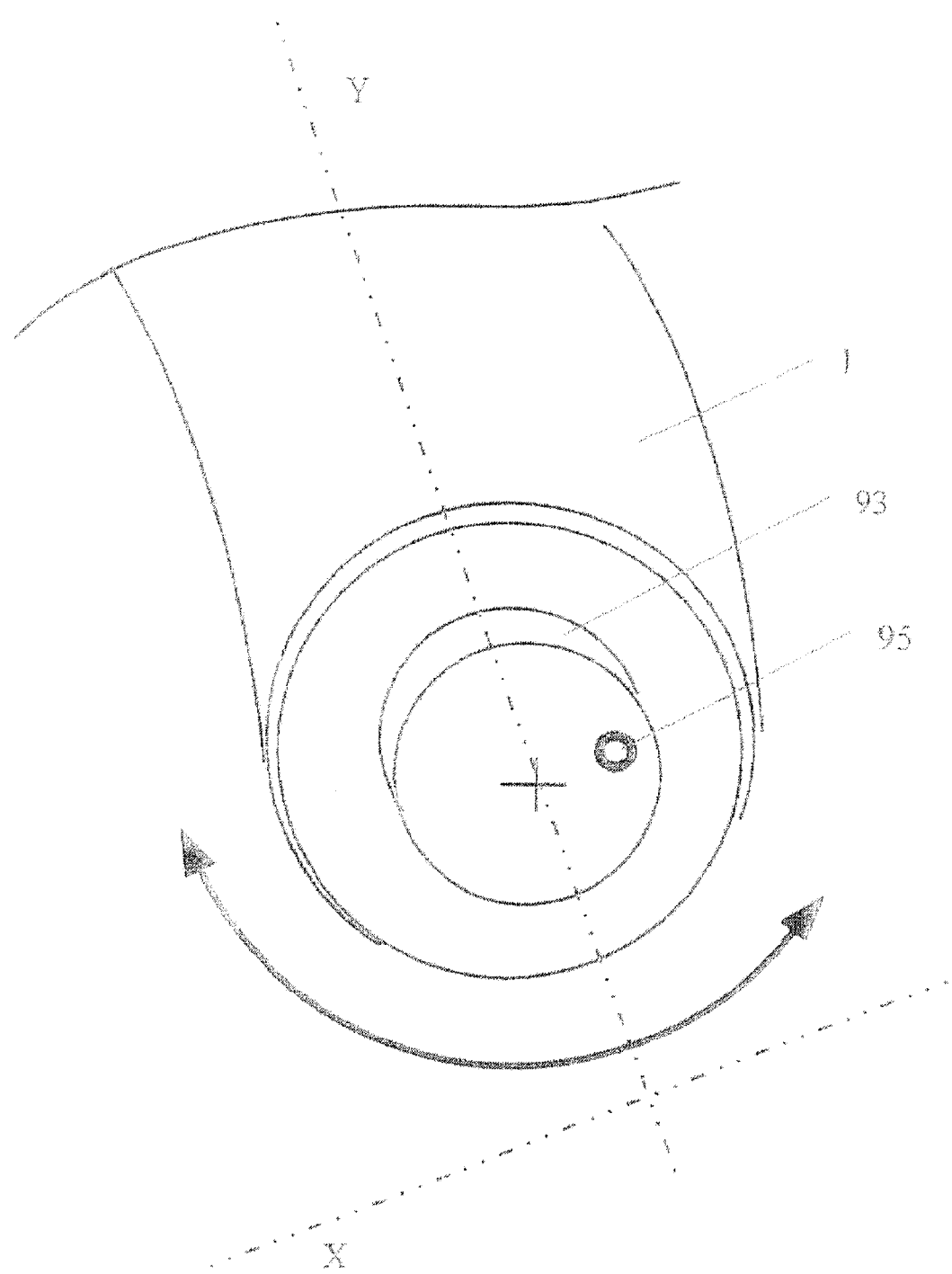
FIG. 2 shows an enlarged perspective detailed view of the blade root of a propeller blade of the variable-pitch propeller illustrated in FIG. 1.

FIG. 2 shows the blade root 93 of the propeller blade 1 from FIG. 1, enlarged and simplified. The axis X of the propeller hub 11 which is at the front in the viewing direction is indicated only by dashed lines.

Figures 3A, 3B:
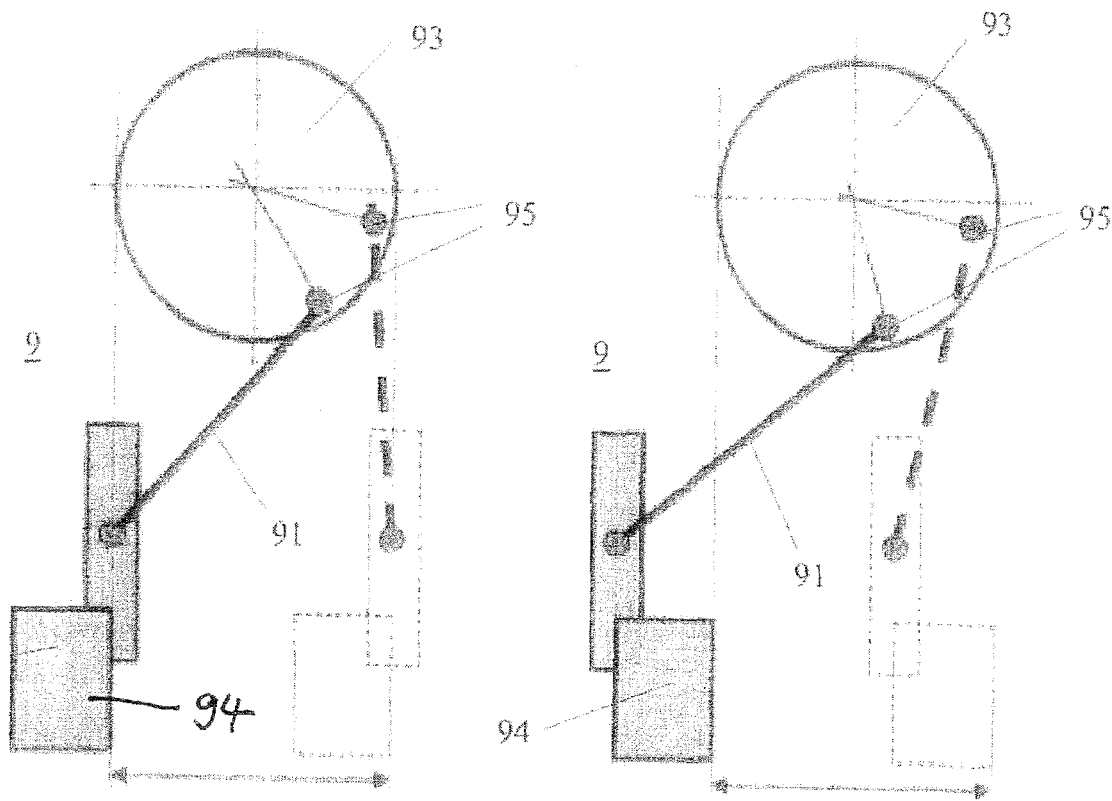
FIGS. 3a and 3b show schematic illustrations of one example of an adjusting apparatus for adjusting the propeller blades of the propeller shown in FIG. 1, showing a vertical view of the blade root shown in FIG. 2, from the propeller axis.

FIGS. 3a and 3b show, schematically, an adjusting apparatus 9 which is used to adjust the propeller blades 1, 2, . . . . This adjusting apparatus 9 in the illustrated exemplary embodiment has a yoke 94 which can be moved in the direction of the propeller axis X, and intermediate elements 91 and 92 which are coupled in a hinged form between the yoke 94 and the blade root 93 of the respective propeller blade 1, 2, . . . . At the blade root 93, the intermediate elements 91, 92 are coupled to respective force action points 95, which are arranged eccentrically with respect to the blade axis Y, in the form of a crank. When the yoke 94 is moved in the direction of the propeller axis X, the propeller blade 1, 2, . . . is thus rotated about its axis Y. Instead of being implemented in this form, the adjusting apparatus 9 may also be implemented in any other suitable manner, for example by means of gearwheels, toothed rods or other means.

The propeller blades 1, 2, . . . of the propeller 10 are grouped into at least one first group A of propeller blades and one second group B of propeller blades, and the adjusting apparatus 9 is designed to adjust the propeller blades in groups such that the propeller blades in one group B are rotated through the critical zone, which has already been discussed in the introduction and in which the propeller blades produce neither thrust nor reverse thrust, and are therefore subject to only a small amount of aerodynamic drag, while the propeller blades in the other group A are not located in the critical zone, and vice versa.

Figure 4:
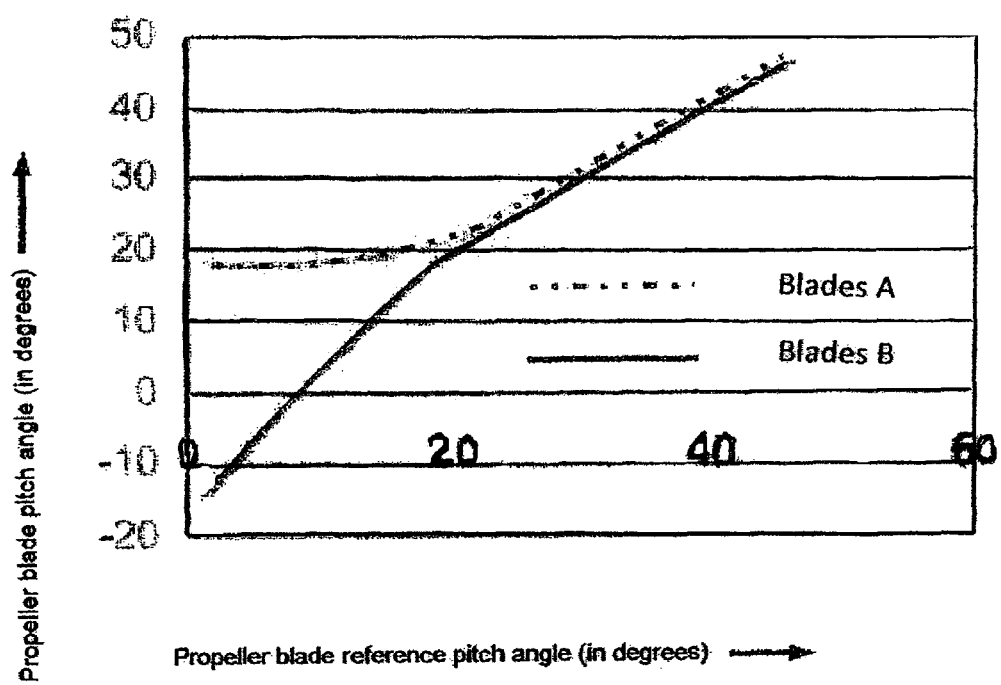
FIG. 4 shows a graph illustrating the pitch angle of two groups of propeller blades as a function of a reference pitch angle.

According to one exemplary embodiment of the invention, the adjusting apparatus 9 is designed such that only the propeller blades in one group B are rotated through the critical zone in order to produce reverse thrust while the other propeller blades, specifically those in group A, are still producing thrust, at least to a certain extent. This situation is illustrated in FIG. 4. In this case, the pitch angle of the propeller blades in group A is illustrated by a dashed-dotted line, while the pitch angle of the propeller blades in group B is illustrated in the form of a solid line, to be precise as a function of a reference pitch angle which, above 20°, corresponds essentially to the pitch angle of the propeller blades 1, 2, . . . .

When the pitch angle is reduced from an initial value of about 48°, the pitch angle of the propeller blades in both groups A, B is initially reduced to the same extent until, at a pitch angle of about 20°, there is a difference between the propeller blades in group A and the propeller blades in group B. While the pitch angle of the propeller blades in group A stagnates at about 18° when the reference angle is being reduced, that is to say it does not decrease any further, there is a further decrease in the pitch angle of the propeller blades in group B through the zero crossing to a pitch angle of about −15°. This means that the propeller blades in group B produce reverse thrust, while the propeller blades in group A are still set to produce a small amount of thrust. The reverse thrust which is produced by the group B propeller blades that have been rotated through the critical zone is in this case greater than the thrust which is produced by the group A propeller blades which have not been rotated through the critical zone, in order to produce the desired reverse thrust, overall.

According to another exemplary embodiment of the invention, the adjusting apparatus 9 is designed such that both the propeller blades in group A and the propeller blades in group B are rotated through the critical zone, but at different times, so that the propeller blades in one group B produce thrust or reverse thrust when the propeller blades in the other group A are producing neither thrust nor reverse thrust, that is to say they are located in the critical zone, and vice versa. This ensures that the propeller blades in one group, which are not located in the critical zone, produce sufficient drag in order to prevent the maximum permissible rotation speed of the propeller drive from being exceeded.

In the exemplary embodiment illustrated schematically in FIGS. 3a and 3b, the position of the force action points 95 on the blade roots 93 together with the length of the intermediate elements 91 and 92 and the position of the at least one yoke 94 with respect to the propeller axis X are chosen such that the propeller blades in one group B are then in fact just being rotated through the critical zone while the propeller blades in the other group A have not yet reached or are no longer located in the critical zone. This is illustrated schematically by the circumferentially different positions of the force action points 95 on the blade root 93 and the different positions of the yoke 94 with respect to the propeller axis X.

The adjusting apparatus 9 according to the invention is intended to adjust the pitch angle of the propeller blades 1, 2, 3, 4, 5, 6, 7, 8 of a variable-pitch propeller in a first blade pitch-angle range with positive pitch angles at which the propeller blades 10 produce thrust,
in a second blade pitch-angle range,
in a third blade pitch-angle range with negative pitch angles, at which the propeller blades produce reverse thrust with the propeller rotating in the same direction.

The second blade pitch-angle range is a pitch-angle intermediate range which is located between the first and the second blade pitch-angle range and includes that pitch-angle range in which the blade drag is a minimum, as well as a range of positive pitch angles with low thrust and a range of negative pitch angles with low reverse thrust. The range of positive pitch angles with low thrust located in the second blade pitch-angle range may extend from the point of minimum drag in particular to the point of 10% of the maximum positive thrust. Furthermore, the range of negative pitch angles with low thrust located in the second blade pitch-angle range may extend from the point of minimum drag in particular to the point of 10% of the maximum negative thrust.

The adjusting apparatus is used to adjust the propeller blades 1, 2, . . . from the first to the third blade pitch-angle range, and vice versa, while operating it by means of an operating apparatus. In this case, the adjusting apparatus 9 is designed such that at least one first group A of the propeller blades 1, 2, . . . can be rotated through the second blade pitch-angle range with critical pitch angles while the propeller blades in another group B are in a positive blade pitch-angle range.

In particular, the adjusting apparatus 9 may be designed such that only the first group B of propeller blades can be rotated through the second pitch-angle range to the third blade pitch-angle range in order to produce reverse thrust, with the reverse thrust which is produced by the propeller blades B which have been rotated through the blade pitch-angle range in which the pitch angle is critical being greater than the thrust produced by the propeller blades in the first group A when the variable-pitch propeller is in the reverse-thrust position.

The adjusting apparatus 9 can also be designed such that at least two groups A, B of propeller blades can each be rotated from the first blade pitch-angle range through the second blade pitch-angle range to the third blade pitch-angle range with a time offset with respect to one another.

In particular, the time offset can be set such that it is possible to provide a propeller blade setting in which the propeller blades in one group B are located in the first or the third blade pitch-angle range while the propeller blades in the other group A are located in the second blade pitch-angle range, and vice versa.

In general, that is to say in the examples and variants of the invention, this procedure can be achieved automatically by means of a control apparatus which sends appropriate command signals to an operating apparatus or drive apparatus, connected upstream of the adjusting apparatus, in a reverse-thrust operating mode which is activated manually or via signals. In addition, an operating apparatus or drive apparatus connected upstream of the adjusting apparatus can move the adjusting apparatus to the reverse-thrust position, with the adjusting apparatus producing the time-offset adjustment of groups of propeller blades via mechanical connecting pieces, which connects the adjusting element to the propeller blades.

The adjusting apparatus 9 may also have the drive apparatuses for adjusting the pitch angle of in each case one propeller blade, which are connected via signal or data lines to the operating apparatus for commanding the drive apparatus and for adjusting the propeller blades.

In general, the adjusting apparatus may have one adjusting element or a plurality of adjusting elements, which can be operated or adjusted by means of an operating apparatus. In order to adjust the propeller blades, it is possible to provide for the at least one adjusting element of the adjusting apparatus to be coupled to the propeller blades by means of intermediate elements, in particular with at least one intermediate element 91 being provided for adjusting in each case one propeller blade 1, 2, . . . and in each case being hinged on the one hand on the adjusting element 94 and on the other hand on a connecting apparatus 95 of the respective propeller blade 1, 2, . . . . The already described ways of adjusting the propeller blades in groups on the basis of the adjustment of the at least one adjusting element can thus be achieved by the kinematic design on the basis of the mechanical coupling of the connecting pieces such as the intermediate elements or the geometric arrangement of the at least one adjusting element, the at least one intermediate element and the connecting apparatus, with a transfer function for blade adjustment resulting as a function of the adjustment of the adjusting element, for which in a first adjustment range of the at least one adjusting element, the pitch angles of the various groups of propeller blades are in the first blade pitch-angle range and differ in particular by a maximum amount of 10 degrees, in a second adjustment range of the at least one adjusting element, the pitch angles of a first group of propeller blades are in the second blade pitch-angle range and the pitch angles of the further groups B of propeller blades are in the first blade pitch-angle range, in a third adjustment range of the at least one adjusting element, in order to implement a reverse-thrust operating mode, the pitch angles of the first group of propeller blades are in the third blade pitch-angle range, and the pitch angles of the further groups B of propeller blades are in the first blade pitch-angle range.

In this case, the adjusting apparatus 9 may, in particular, be implemented such that a crank 92, 192, 292 is fitted in a rotationally fixed form to each propeller blade, on which crank 92, 192, 292 in each case one connecting apparatus 95, 195, 295 is provided for hinged holding of an intermediate element, with the connecting apparatus 95, 195, 295 being located eccentrically with respect to the propeller axis, the at least one intermediate element 91, 191, 291 for adjusting in each case one propeller blade 1, 2, . . . , which is in each case hinged on the one hand on the adjusting element 94 and on the other hand on the connecting apparatus 95, 195, 295, the adjusting apparatus 9 has one or more adjusting elements for coupling the output of the operating apparatus and the intermediate elements.

In one implementation of the adjusting apparatus having a plurality of adjusting elements for adjusting propeller blades in groups, it is possible in particular for each adjusting element to be guided such that it can be moved by means of a guide apparatus which runs along the propeller axis X, such as a guide rod or guide web, with the rotation angle of the adjusting element being constant while it is being moved. In this case, in particular, one guide apparatus can be provided for in each case one adjusting element, and/or one guide apparatus can be provided for a plurality of adjusting elements. In this case, the adjusting elements may be arranged on the same guide apparatus. Alternatively, a plurality of guide apparatuses can also be provided, with each adjusting element which is allocated to one group of propeller blades being arranged on a dedicated guide apparatus.

In a further exemplary embodiment of the adjusting apparatus 9, this adjusting apparatus 9 may have at least one spindle which runs in the longitudinal direction of the propeller axis X and on which the adjusting element 94, 194 can be moved, with the rotation angle being varied. The adjusting element can be adjusted by the operating apparatus by rotation or by movement on the spindle. Together with adjustment of the adjusting element, the kinematics of the intermediate elements then result in the propeller blades being adjusted. In this case, if a plurality of spindles are provided, one spindle may be provided for in each case one adjusting element and/or, if one spindle is provided, one spindle may be provided for a plurality of adjusting elements.

In a further exemplary embodiment of the adjusting apparatus 9, in each case one adjusting element 194, 294 can be provided for each group of propeller blades, in particular with the adjusting elements being arranged on the same spindle or guide apparatus. If a plurality of spindles or guide apparatuses are provided, each adjusting element which is allocated to one group of propeller blades may be arranged on a dedicated spindle or guide apparatus. In this embodiment, each spindle itself can adjust one propeller blade via one or more adjusting elements.

In this case, the adjusting elements 194, 294, each of which can be mechanically coupled in particular to different groups of propeller blades. The adjusting elements are coupled via intermediate elements to connecting apparatuses 95 on the blade roots 93 of the propeller blades of in each case one group and, for example, the first group A of propeller blades. In order to allow the propeller blades to be adjusted in groups, the rotation positions of the connecting apparatuses which belong to the first group of propeller blades in each case are offset with respect to one another seen in the rotation direction about the propeller axes with respect to the connecting apparatuses 95 on the blade roots 93 of the at least one further group B.

In an alternative embodiment of the invention, a plurality of adjusting elements are provided in order to adjust the propeller blades in groups, which adjusting elements are not mechanically coupled but are actuated independent by means of the control apparatus and/or the operating apparatus such that each adjusting element 194, 294 adjusts one group of propeller blades, and each adjusting element is operated independently by means of one operating apparatus and one drive apparatus.

In a further embodiment, the adjusting apparatus may have an adjusting element 294 which can be rotated by means of the operating apparatus about the propeller axis X, as well as in each case one intermediate element which is hinged on the adjusting element and the respective connecting apparatus of the respective propeller blade. For this purpose, in particular, the adjusting apparatus 9 may have a spindle which runs in the longitudinal direction of the propeller axis X and on which the adjusting element 94, 194 can be moved with the rotation angle being varied. Alternatively, the adjusting element may be guided such that it can be moved by means of a guide apparatus which runs along the propeller axis X, with the rotation angle of the adjusting element while it is being moved being constant, in which case one guide apparatus can be provided for in each case one adjusting element, and/or one guide apparatus can be provided for a plurality of adjusting elements.

The arrangement of the propeller blades, that is to say the configuration of the groups of propeller blades for their time-offset adjustment, may in particular be as follows:

An even number of propeller blades and blade roots 93 may be provided and the adjusting apparatus may be provided for coupling to an even number of blade roots 93, with the propeller blades in the first group A of propeller blades being arranged alternately with the propeller blades in the second group B of propeller blades, seen in the rotation direction about the propeller axis X.

Figure 7A:
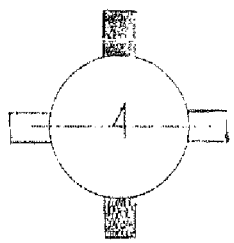
FIG. 7a shows a schematic illustration of a propeller having four propeller blades, with one example of a first group of propeller blades being shown in bold.

In particular, four propeller blades and blade roots 93 may be provided, and the adjusting apparatus may be designed for coupling to a total of four propeller blades, of which two propeller blades which are opposite with respect to the propeller axis X are allocated to the first group of propeller blades (FIG. 7*a*).

Figure 7B:
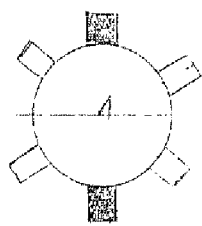
FIGS. 7b and 7c show a schematic illustration of a propeller having six propeller blades with two further examples of a first group of propeller blades being shown in bold, with two propeller blades in the case of the propeller of FIG. 7b, and three propeller blades in the case of the propeller of FIG. 7c forming the first group of propeller blades.
Figure 7C:
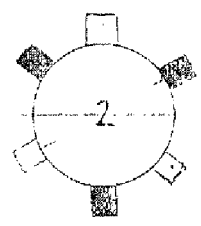
Figure 7D:
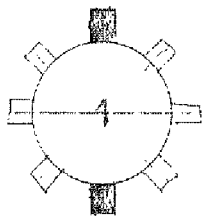
FIGS. 7d and 7e show a schematic illustration of a propeller having eight propeller blades with two further examples of a first group of propeller blades being shown in bold, with two propeller blades in the case of the propeller of FIG. 7d, and three propeller blades in the case of the propeller of FIG. 7e forming the first group of propeller blades.
Figure 7E:
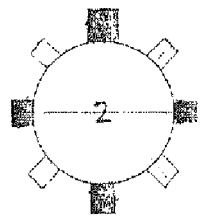
Figure 7F:
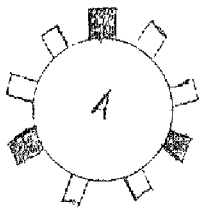
FIG. 7f shows a schematic illustration of a propeller having nine propeller blades with an example of a first group of propeller blades being shown in bold, with three propeller blades forming the first group of propeller blades in the case of the propeller of FIG. 7f.

In particular, six or eight propeller blades and blade roots 93 may be provided (FIGS. 7*b* and 7*c*, and FIGS. 7*d* and 7*e*), and the adjusting apparatus may accordingly be designed for coupling to a total of six or eight propeller blades, of which a total of two propeller blades which are opposite with respect to the propeller axis (X) form the first group of propeller blades (FIGS. 7*b* and 7*d*). Alternatively, a total of six or eight propeller blades may form the first group of propeller blades having three (FIG. 7*c*) or four (FIG. 7*e*) propeller blades, with the position of the propeller blades in the first group being determined in that they alternate with the propeller blades in the second group, seen in the rotation direction about the propeller axis X.

Furthermore, a total of nine propeller blades and blade roots 93 may be provided, and the adjusting apparatus may be coupled for coupling to a total of nine propeller blades, of which a total of three propeller blades which are located in this way are allocated to the first group of propeller blades, in that two propeller blades for the second group of propeller blades are located between two adjacent propeller blades 95 in the first group of propeller blades, seen in the rotation direction about the propeller axis X.

Furthermore, a plurality of first groups A of propeller blades may be provided.

Furthermore, according to the invention, a variable-pitch propeller is provided having an adjusting apparatus based on the above concept and the individual examples which have already been described. The variable-pitch propeller has a propeller shaft and a plurality of blade roots which are fitted to it along its circumferential direction, each having a bearing device for bearing in each case one propeller blade, in which case one propeller blade 1, 2, 3, 4, 5, 6, 7, 8 is mounted in the respective bearing device such that it can rotate about a blade axis Y which extends at an angle, and in particular radially, with respect to the propeller axis X. In this case, the number of blade roots 93 with force action points 95 and the arrangement of the blade roots 93 of the first group A of propeller blades may be described as before relative to the blade roots 93 of the second group A, seen in the rotation direction about the propeller axis X.

Furthermore, according to the invention, a control apparatus is provided for actuating an adjusting apparatus, whose variants have already been described. The control apparatus produces control commands or control signals in the reverse-thrust operating mode on the basis of a signal which sets or provides the reverse-thrust operating mode in the control device. The control commands or control signals are passed to an operating apparatus and/or drive apparatus which, in particular, mechanically adjusts the adjusting apparatus, and thus adjusts the blade pitch angle of propeller blades in groups.

The control apparatus may be in the form of a digital or analog computer. Accordingly, according to the invention, a control function which can be implemented in a computer is also provided for adjusting an adjusting apparatus for propellers, with the control program using data for adjusting propeller blades of the propeller as an input variable and, as an output, producing command variables for operating the adjusting apparatus according to the invention.

According to the invention, a method is also provided for adjusting the pitch angle of propeller blades 1, 2, 3, 4, 5, 6, 7, 8 of a variable-pitch propeller, which
    in a first blade pitch-angle range with positive pitch angles
        at which the propeller blades 10 produce thrust,
    in a second blade pitch-angle range, in a third blade pitch-angle range with negative pitch angles, at which the propeller blades produce reverse thrust with the propeller rotating in the same direction, with the second blade pitch-angle range being a pitch-angle intermediate range located between the first and the second blade pitch-angle range, which includes the pitch-angle range in which the blade drag is a minimum, as well as a range of positive pitch angles with low thrust and a range of negative pitch angles with low reverse thrust. The method provides a cruise-flight operating mode, in which the pitch angles of the various groups of propeller blades are in the first blade pitch-angle range, and a reverse-thrust operating mode.

In this case, in a first adjustment range of the at least one adjusting element, the pitch angles of the various groups of propeller blades are in the first blade pitch-angle range, in a second adjustment range of the at least one adjusting element, the pitch angles of a first group of propeller blades are in the second blade pitch-angle range of critical pitch angles and the pitch angles of the further groups (B) of propeller blades are in the first blade pitch-angle range, in a third adjustment range of the at least one adjusting element, in order to provide a reverse-thrust operating mode, the pitch angles of the first group of propeller blades are in the third blade pitch-angle range and the pitch angles of the further groups (B) of propeller blades are in the first blade pitch-angle range.

In the method for adjusting the pitch angle of propeller blades 1, 2, 3, 4, 5, 6, 7, 8 of a variable-pitch propeller, it is possible to provide that in the reverse-thrust operating mode, only the propeller blades in the at least one group B can be rotated through the second range of critical pitch angles to the third pitch-angle range, in which case, when the variable-pitch propeller is in the reverse-thrust position, the reverse thrust which is produced by those propeller blades B which have been rotated through the range of critical pitch angles is greater than the thrust which is produced by the other propeller blades A.

Alternatively, in the method according to the invention for adjusting the pitch angle of propeller blades 1, 2, 3, 4, 5, 6, 7, 8 of a variable-pitch propeller, it is possible to provide that in the reverse-thrust operating mode, at least two groups A, B of propeller blades are each rotated with a time offset with respect to one another from the first adjustment range through the second range of critical pitch angles to the third range, such that a propeller-blade setting can be provided for which the propeller blades of the one group (B) are located in the first or third pitch-angle range, while the propeller blades of the other group A are located in the second range of critical pitch angles, and vice versa.

The described variable-pitch propeller has a number of advantages. The idling rotation speed which occurs on thrust reversal can be kept at a low value thus avoiding excessive load on the components of the propeller drive. The components of the propeller drive, in particular such as a turbine driving the propeller, need not be designed for excessive loading in the critical range, and thus leads to a weight saving. The twisting of the propeller blades can be optimized for cruise flight, since there is no need to increase the aerodynamic drag for the critical range of the propeller blades by means of extra major twisting of them. The normally "critical zone" or the second blade pitch-angle range need not be passed through particularly quickly, since the reverse thrust of the variable-pitch propeller can be set well. The variable-pitch propeller can also be used for yaw-angle control when braking in the presence of a sidewind.

| List of reference symbols | |
|---|---|
| 1, 2, 3, 4, 5, 6, 7, 8 | Propeller blades |
| 9 | Adjusting apparatus |
| 10 | Propeller |
| 11 | Hub |
| 91, 92 | Intermediate elements |
| 93 | Blade root |
| 94 | Yoke |
| 95 | Force action point |

The invention claimed is:

1. An adjusting apparatus (9) for adjusting the pitch angle of propeller blades (1, 2, 3, 4, 5, 6, 7, 8) of a variable-pitch propeller in a first blade pitch-angle range with positive pitch angles at which the propeller blades (10) produce thrust, in a second blade pitch-angle range, in a third blade pitch-angle range with negative pitch angles, at which the propeller blades produce reverse thrust with the propeller rotating in the same direction, with the second blade pitch-angle range being a pitch-angle intermediate range located between the first and the second blade pitch-angle range, which includes the pitch-angle range in which the blade drag is a minimum, as well as a range of positive pitch angles with low thrust and a range of negative pitch angles with low reverse thrust, and with the adjusting apparatus being able to provide adjustment of the propeller blades (1, 2, . . . ) from the first to the third blade pitch-angle range and vice versa, characterized in that the adjusting apparatus (9) is designed such that, on the basis of it being operated by means of an operating apparatus, at least a first group (A) of the propeller blades (1, 2, . . . ) can be rotated through the second blade pitch-angle range, while the propeller blades in another group (B) are in a positive blade pitch-angle range.

2. The adjusting apparatus as claimed in claim 1, characterized in that the adjusting apparatus (9) is designed such that only the first group (B) of propeller blades can be rotated through the second pitch-angle range to the third blade pitch-angle range in order to produce reverse thrust, with the reverse thrust which is produced by the propeller blades (B) which have been rotated through the blade pitch-angle range of critical pitch angles being greater than the thrust produced by the propeller blades in the first group (A) when the variable-pitch propeller is in the reverse-thrust position.

3. The adjusting apparatus (9) as claimed in claim 1, characterized in that the adjusting apparatus (9) is designed such that at least two groups (A, B) of propeller blades can each be rotated with a time offset with respect to one another from the first blade pitch-angle range through the second blade pitch-angle range to the third blade pitch-angle range, with the time offset being set such that a propeller blade setting can be provided at which the propeller blades in the one group (B) are located in the first or the third blade pitch-angle range, while the propeller blades in the other group (A) are located in the second blade pitch-angle range, and vice versa.

4. The adjusting apparatus (9) as claimed in claim 1, characterized in that the adjusting apparatus has drive apparatuses for adjusting the pitch angle of in each case one propeller blade, which drive apparatuses are connected via signal or data lines to the operating apparatus for commanding the drive apparatus and for adjusting the propeller blades.

5. The adjusting apparatus (9) as claimed in claim 1, characterized in that the adjusting apparatus (9) has at least one adjusting element (94) which can be adjusted by means of an operating apparatus and at least one intermediate element (91, 92) for adjusting in each case one propeller blade (1, 2, . . . ), which is in each case hinged on the one hand on the adjusting element (94) and on the other hand on a connecting apparatus (95) of the respective propeller blade (1, 2, . . . ), with the geometric arrangement comprising the at least one adjusting element, the at least one intermediate element and the connecting apparatus (95, 195, 295) resulting in a transfer function of the blade pitch adjustment as a function of the adjustment of the adjusting element, for which: in a first adjustment range of the at least one adjusting element, the pitch angles of the various groups of propeller blades are in the first blade pitch-angle range and differ by a maximum amount of 10 degrees, in a second adjustment range of the at least one adjusting element, the pitch angles of a first group of propeller blades are in the second blade pitch-angle range and the pitch angles of the further groups (B) of propeller blades are in the first blade pitch-angle range, in a third adjustment range of the at least one adjusting element, in order to implement a reverse-thrust operating mode, the pitch angles of the first group of propeller blades are in the third blade pitch-angle range, and the pitch angles of the further groups (B) of propeller blades are in the first blade pitch-angle range.

6. The adjusting apparatus (9) as claimed in claim 5, characterized in that a crank (92, 192, 292) is fitted in a rotationally fixed form to each propeller blade, on which crank (92, 192, 292) in each case one connecting apparatus (95, 195, 295) is provided for hinged holding of an intermediate element, with the connecting apparatus (95, 195, 295) being located eccentrically with respect to the propeller axis, the at least one intermediate element (91, 191, 291) for adjusting in each case one propeller blade (1, 2, . . . ), which is in each case hinged on the one hand on the adjusting element (94) and on the other hand on the connecting apparatus (95, 195, 295), the adjusting apparatus (9) has one or more adjusting elements for coupling the output of the operating apparatus and the intermediate elements.

7. The adjusting apparatus (9) as claimed in claim 5, characterized in that each adjusting element is guided such that it can be moved by means of a guide apparatus which runs along the propeller axis (X), with the rotation angle of the adjusting element being constant while it is being moved, in which case one guide apparatus can be provided for in each case one adjusting element and/or one guide apparatus can be provided for a plurality of adjusting elements.

8. The adjusting apparatus (9) as claimed in claim 7, characterized in that the adjusting elements are arranged on the same guide apparatus, or in that a plurality of guide apparatuses are provided, with each adjusting element which is associated with one group of propeller blades being arranged on a dedicated guide apparatus.

9. The adjusting apparatus (9) as claimed in claim 5, characterized in that the adjusting apparatus (9) has at least one spindle which runs in the longitudinal direction of the propeller axis (X), and on which the adjusting element (94, 194) can be moved with the rotation angle being varied, in which case one spindle can be provided for in which case one adjusting element, and/or one spindle can be provided for a plurality of adjusting elements.

10. The adjusting apparatus (9) as claimed in claim 5, characterized in that in each case one adjusting element (194, 294) is provided for each group of propeller blades.

11. The adjusting apparatus (9) as claimed in claim 10, characterized in that the adjusting elements are arranged on the same spindle or in that a plurality of spindles are provided, with each adjusting element which is associated with one group of propeller blades being arranged on a dedicated spindle.

12. The adjusting apparatus (9) as claimed in claim 10, characterized in that the adjusting elements (194, 294) for different groups of propeller blades are mechanically coupled, with the connecting apparatuses (95) on the blade roots (93) of the first group (A) of propeller blades in each case being offset with respect to one another seen in the rotation direction about the propeller axes with respect to the connecting apparatuses (95) on the blade roots (93) of the at least one further group (B).

13. The adjusting apparatus (9) as claimed in claim 1, characterized in that each adjusting element (194, 294) adjusts one group of propeller blades, and in that each adjusting element is operated independently by means of an operating apparatus and a drive apparatus.

14. The adjusting apparatus (9) as claimed in claim 5, characterized in that the adjusting apparatus has an adjusting element (294) which can be adjusted by means of the operating apparatus and which can be rotated about the propeller axis (X), as well as in each case one intermediate element which is hinged on the adjusting element and the respective connecting apparatus of the respective propeller blade.

15. The adjusting apparatus (9) as claimed in claim 14, characterized in that the adjusting apparatus (9) has a spindle which runs in the longitudinal direction of the propeller axis (X) and on which the adjusting element (94, 194) can be moved with the rotation angle being varied.

16. The adjusting apparatus (9) as claimed in claim 14, characterized in that each adjusting element is guided such that it can be moved by means of a guide apparatus which runs along the propeller axis (X), with the rotation angle of the adjusting element while it is being moved being constant, in which case one guide apparatus can be provided for in each case one adjusting element, and/or one guide apparatus can be provided for a plurality of adjusting elements.

17. The adjusting apparatus (9) as claimed in claim 1, characterized in that the adjusting apparatus is intended for coupling to an even number of blade roots (93), with the propeller blades in the first group (A) of propeller blades being arranged alternately with the propeller blades in the second group (B) of propeller blades, seen in the rotation direction about the propeller axis (X).

18. The adjusting apparatus (9) as claimed in claim 1, characterized in that the adjusting apparatus is intended for coupling to a total of four propeller blades, of which two propeller blades which are opposite with respect to the propeller axis (X) are allocated to the first group of propeller blades.

19. The adjusting apparatus (9) as claimed in claim 1, characterized in that the adjusting apparatus is coupled to a total of six or eight propeller blades, of which a total of two propeller blades which are opposite with respect to the propeller axis (X) are allocated to the first group of propeller blades.

20. The adjusting apparatus (9) as claimed in claim 1, characterized in that the adjusting apparatus is coupled to a total of nine propeller blades, of which a total of three propeller blades which are located in this way are allocated to the first group of propeller blades, in that two propeller blades for the second group of propeller blades are located between two adjacent propeller blades (95) in the first group of propeller blades, seen in the rotation direction about the propeller axis (X).

21. The adjusting apparatus (9) as claimed in claim 1, characterized in that a plurality of first groups (A) of propeller blades are provided.

22. A variable-pitch propeller with an adjusting apparatus as claimed in claim 6, with the variable-pitch propeller having a propeller axis and a plurality of blade roots, which are fitted thereto along its circumferential direction and each have a bearing device for bearing in each case one propeller blade, in which case one propeller blade (1, 2, . . . ) is mounted in the respective bearing device such that it can rotate about a blade axis (Y) which extends at an angle, and in particular radially, with respect to the propeller axis (X).

23. The variable-pitch propeller with an adjusting apparatus (9) as claimed in claim 22, characterized in that an even number of blade roots (93) with force action points (95) are provided, with the force action points (95) of the blade roots (93) of the first group (A) of propeller blades being arranged alternately with the blade roots (93) of the second group (A) of propeller blades, seen in the rotation direction about the propeller axis (X).

24. The variable-pitch propeller with an adjusting apparatus (9) as claimed in claim 22, characterized in that a total of four force action points (95) are provided and are arranged on in each case one blade root (93), of which two force action points (95) which are opposite with respect to the propeller axis (X) are allocated to the first group of propeller blades.

25. The variable-pitch propeller with an adjusting apparatus (9) as claimed in claim 22, characterized in that a total of six or eight force action points (95) are provided and are arranged on in each case one blade root (93), of which a total of two force action points (95) which are located opposite with respect to the propeller axis (X) are allocated to the first group of propeller blades.

26. The variable-pitch propeller with an adjusting apparatus (9) as claimed in claim 22, characterized in that a total of nine force action points (95) are provided and are arranged on in each case one blade root (93), of which a total of three force action points (95) which are located in this way are allocated to the first group of propeller blades, in that two force action points (95) for the second group of propeller blades are located between two adjacent force action points (95) for the first group of propeller blades, seen in the rotation direction about the propeller axis (X).

27. A control apparatus for actuating an adjusting apparatus as claimed in claim 1, in order to adjust the blade pitch angle of propeller blades by adjustment of the adjusting apparatus.

28. A control function which can be implemented in a computer for adjustment of an adjusting apparatus for propellers, with the control program using data for adjusting propeller blades of the propeller as an input variable and, as an output, producing command variables for operating the adjusting apparatus as claimed in claim 1.

29. A method for adjusting the pitch angle of propeller blades (1, 2, 3, 4, 5, 6, 7, 8) of a variable-pitch propeller in a first blade pitch-angle range with positive pitch angles at which the propeller blades (10) produce thrust, in a second blade pitch-angle range, in a third blade pitch-angle range with negative pitch angles, at which the propeller blades produce reverse thrust with the propeller rotating in the same direction, with the second blade pitch-angle range being a pitch-angle intermediate range located between the first and the second blade pitch-angle range, which includes the pitch-angle range in which the blade drag is a minimum, as well as a range of positive pitch angles with low thrust and a range of negative pitch angles with low reverse thrust, characterized in that the method provides a cruise-flight operating mode, in which the pitch angles of the various groups of propeller blades are in the first blade pitch-angle range, in that the method provides a reverse-thrust operating mode, in which in a first adjustment range of the at least one adjusting element, the pitch angles of the various groups of propeller blades are in the first blade pitch-angle range, in a second adjustment range of the at least one adjusting element, the pitch angles of a first group of propeller blades are in the second blade pitch-angle range of critical pitch angles and the pitch angles of the further groups (B) of propeller blades are in the first blade pitch-angle range, in a third adjustment range of the at least one adjusting element, in order to provide a reverse-thrust operating mode, the pitch angles of the first group of propeller blades are in the third blade pitch-angle range and the pitch angles of the further groups (B) of propeller blades are in the first blade pitch-angle range.

30. The method for adjusting the pitch angle of propeller blades (1, 2, 3, 4, 5, 6, 7, 8) of a variable-pitch propeller as claimed in claim 29, characterized in that, in the reverse-thrust operating mode, only the propeller blades in the at least one group (B) can be rotated through the second range of critical pitch angles to the third pitch-angle range, in which case, when the variable-pitch propeller is in the reverse-thrust position, the reverse thrust which is produced by those propeller blades (B) which have been rotated through the range of critical pitch angles is greater than the thrust which is produced by the other propeller blades (A).

31. The method for adjusting the pitch angle of propeller blades (1, 2, 3, 4, 5, 6, 7, 8) of a variable-pitch propeller as claimed in claim 29, characterized in that, in the reverse-thrust operating mode, at least two groups (A, B) of propeller blades are each rotated with a time offset with respect to one another from the first adjustment range through the second range of critical pitch angles to the third range, such that a propeller-blade setting can be provided for which the propeller blades of the one group (B) are located in the first or third pitch-angle range, while the propeller blades of the other group (A) are located in the second range of critical pitch angles, and vice versa.

\* \* \* \* \*